United States Patent [19]

Cutts et al.

[11] 3,966,530

[45] June 29, 1976

[54] SURFACE TREATMENT OF POLYMERS

[75] Inventors: Ernest Cutts; Geoffrey Thomas Knight, both of London, England

[73] Assignee: The Malaysian Rubber Producers' Research Association, England

[22] Filed: Oct. 29, 1974

[21] Appl. No.: 518,938

[52] U.S. Cl. .............................. 156/308; 156/314; 156/330; 260/308 C; 427/302; 427/407; 427/400; 427/444; 427/402; 428/420; 428/463; 428/493; 428/520; 428/462; 428/465; 428/519
[51] Int. Cl.² .......................................... C09J 5/02
[58] Field of Search .......... 156/308, 314, 307, 331, 156/309, 110 A, 306, 330; 117/139, 161 UA, 47 A; 161/217, 219, 221, 243, 253, 184, 186; 260/308 C, 308 R, 308 B, 30.4 N, 889, 890, 784, 30.2; 252/357; 427/301, 302, 333, 337, 340, 400, 402, 407, 444; 428/420, 462, 463, 465, 466, 493, 495, 519, 520, 543

[56] References Cited
UNITED STATES PATENTS

| | | | |
|---|---|---|---|
| 2,078,910 | 4/1937 | Merrill | 156/308 |
| 2,887,405 | 5/1959 | Wooding | 117/161 UA |
| 3,053,712 | 9/1962 | Grabowski | 156/308 |
| 3,318,728 | 5/1967 | Lilyquist | 117/161 UA |
| 3,837,964 | 9/1974 | Cotton et al. | 260/308 B |

OTHER PUBLICATIONS

Chem. Abstracts No. 113610m (vol. 76, issue 20) 1972, Guilbault, et al.

*Primary Examiner*—Douglas J. Drummond
*Assistant Examiner*—J. J. Gallagher
*Attorney, Agent, or Firm*—Wenderoth, Lind & Ponack

[57] ABSTRACT

A method of surface treating elastomer surfaces comprises applying thereto a 4-substituted-1,2,4-triazoline-3,5-dione preferably in solution. The treatment improves adhesion using normal elastomer adhesives, improves resistance to peeling with flexible paints and reduces the surface tack of the elastomer. The method is advantageous over prior art chlorination and halogen donor techniques particularly in that the triazoline diones are relatively non-corrosive and non-toxic.

10 Claims, No Drawings

SURFACE TREATMENT OF POLYMERS

This invention relates to a process for the surface modification of vulcanized and unvulcanized unsaturated elastomers to aid subsequent bonding or painting, or to reduce surface tack.

The bonding of metals, paints and other materials, to rubber surfaces is normally poor and subject to wide variability. This problem is currently overcome by the use of an aqueous chlorination process prior to bonding. This chlorination process, although increasing bonding and reducing bond variability, is time consuming and requires the use of corrosive chemicals. The reduction of surface tack as applied to articles such as rubber gloves is also currently achieved via aqueous chlorination and hence suffers from similar drawbacks.

Halogenation treatments using reactive chlorine or bromine containing compounds have been proposed. These involve surface treatment of elastomers with a halogen donor. Some of the disadvantages of aqueous chlorination can be overcome in this way but halogen donors are generally reactive, releasing halogen on contact with moisture, and are fairly toxic.

The present invention accordingly provides a method of treating a surface of an unsaturated elastomer which method comprises applying to the elastomer surface a 4-substituted-1,2,4-triazoline-3,5-dione.

The reaction with unsaturated elastomers is believed to be:

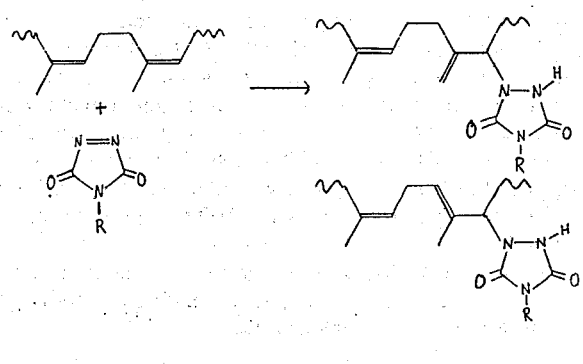

The polymer chain illustrated here is that of natural rubber and a similar reaction is believed to take place with synthetic rubbers. Thus the activated azo group reacts with the polymer chain specifically at the double bond and an adjacent allylic hydrogen giving a polar pendant group and causing the position of the double bond to move. It is the polar pendant group which improves bonding between the rubber and another substrate.

The preferred compounds for use in the invention have the following formulae:

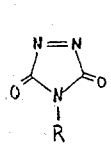 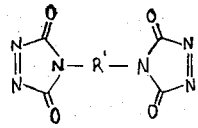

I  II wherein R may be alkyl preferably $C_1$ to $C_6$ alkyl, or aryl preferably phenyl or naphthyl and R' may be alkylene preferably $C_1$ to $C_6$ alkylene or arylene preferably phenylene.

Typical preferred compounds for the process of the invention are 4-phenyl-1,2,4-triazoline-3,5-dione, 4-methyl-1,2,4-triazoline-3,5-dione, 4-butyl-1,2,4-triazoline-3, 5-dione, 4-napthyl-1,2,4-triazoline-3,5-dione or bis-(p-3, 5-dioxo-1,2,4-triazoline-4-yl-phenyl) methane.

The invention is particularly applicable to unsaturated elastomers typified by natural rubber (NR), styrene butadiene rubber (SBR), natural rubber/butadiene rubber (BR) blend (the blend is used because of the very poor strength of butadiene rubbers), and polychloroprene. The improvement in bond strength when the vulcanized rubber is bonded to steel in the first three cases is very marked whereas in the case of polychloroprene the improvement is only slight because high bond strength is attainable with untreated polychloroprene vulcanizate. The invention is also applicable to unvulcanized rubber.

The 4-substituted-1,2,4-triazoline-3,5-diones can be applied by any convenient method. Application in a solvent by painting, scrubbing, dipping, spraying or other suitable means is preferred. The solvent should be one in which the 4-substituted-1,2,4-triazoline-3,5-dione is reasonably soluble, one which will not react substantially with the 4-substituted-1,2,4-triazoline-3,5-dione and is sufficiently volatile that the substrate does not have to be treated excessively to remove it. Also, particularly when spraying, the solvent should be sufficiently involatile so that as actually applied to the substrate the 4-substituted-1,2,4-triazoline-3,5-dione is in solution, i.e. the solvent has not evaporated to leave only solid. If the solvent is too volatile treatment tends to be patchy and irregular.

The minimum concentration of 4-substituted-1,2,4-triazoline-3,5-dione in the solvent is that at which the desired level of surface modification can be achieved. Concentrations of less than 0.1% (w/v) are only marginally effective (unless very long dipping times or large amounts of spray etc. are used). The maximum concentration is limited by the solubility of the triazoline dione in the solvent. Where the triazoline dione is applied by dipping the concentration can conveniently be in the range 0.1% (w/v) to saturation preferably 0.5 to 2% (w/v). Where the triazoline dione is sprayed onto the elastomer surface the preferred concentration range is from 0.5 to 10% optimally 1 to 5% (w/v). For application by scrubbing concentrations from 5% (w/v) to saturation are appropriate with an optimum concentration of about 10% (w/v). Where compounds of the formula II are used then their bi-functional nature means that they are approximately twice as weight effective and weight concentrations can be reduced accordingly. Suitable solvents include suitably volatile esters. Ethyl acetate and n-butyl acetate have proven suitable.

The time of immersion of natural rubber and natural rubber/butadiene rubber blends in solution of the above compounds does not affect the bond strength in any very regular manner provided that at least sufficient time is given for reaction and dipping times of 1 to 20 mins with 1% solutions seem adequate. With SBR as the rubber, however, a definite trend is noticed, the bond strength increasing as the time of dipping increases, reaching a maximum before falling. For example 10 mins is the most advantageous dipping time with a 1% solution of 4-phenyl-1,2,4-triazoline-3,5-dione.

The total amount of triazoline dione applied to the elastomer surface is generally in the range of from 0.1 to 20 g.m.$^{-2}$ and preferably 2 to 10 g.m.$^{-2}$. The optimum amount in any particular case will depend on the method of application, the reactivity, functionality and molecular weight of the triazoline dione, and the desired level of treatment. Determination of the optimum rate of application in any particular case can readily be made by experiment.

The 4-substituted-1,2,4-triazoline-3,5-diones used in the invention can be synthesized by the oxidation of the corresponding 4-substituted urazoles which can be prepared by the cyclization under alkaline conditions of the corresponding 4-substituted-1-alkoxy-semicarbanzide. The crude triazoline-diones obtained directly from the oxidation step can be used in the present invention or they may be purified, e.g. by sublimation. No particular deleterious effects have been noted from use of crude materials. The 4-substituted-1,2,4-triazoline-3,5-diones are typically highly coloured, usually red or orange, solids.

The invention is effective as a surface treatment for rubber to rubber and rubber to non-rubber e.g. rubber to metal bonding, for keying surfaces for painting and for reducing surface tack.

The particular adhesive used is not critical to the invention although for best results adhesives giving higher bond strengths to rubber e.g. on chlorinated rubber should be used. Conventional adhesives include two part epoxy resins and thermally curable polymeric adhesives and these general types produce satisfactory results. The range of adhesives sold under the Trade name Chemlok by the Lord Corporation, are typical of conventional rubber adhesives e.g. Chemlok 305 and Chemlok 205/231.

The invention is illustrated in and by the following Examples. In the Examples five types of vulcanized rubber are used (termed vulcanizates 1, 2, 3 4 or 5). Details of the composition and preparation of these vulcanizates are given in Table 1.

The standard method of cleaning the metal plates was to wash them in boiling Genklene for 1 min, sand blast using G12 chilled iron grit, and finally wash them in boiling Genklene for 1 min.

Bonding was tested by sticking two strips of adhesive tape to the rubber strips (cut 27 cm by 90 cm) or the metal pieces (25mm by 63mm) so that the gap between them was 25mm. The adhesive was then applied to the rubber and/or metal surfaces between the adhesive tape so that the application of adhesive was limited by the tape.

The bonds were tested according to BS 903: Part A21, method B except that the rubber thickness was only 3mm.

Spraying was carried out at about 70psi over a 1mm nozzle, with 1 pass giving an application rate of about 125 ml/m$^2$.

TABLE 1.

|  | Vulcanizate No. | | | | |
|---|---|---|---|---|---|
|  | 1 | 2 | 3 | 4 | 5 |
| SMR 5 (NR) | 100 | 100 | — | 30 | — |
| Intal 1502(SBR) | — | — | 100 | — | — |
| Intene SSNF(BR) | — | — | — | 70 | — |
| Neoprene WRT (Polychloroprene) | — | — | — | — | 100 |
| SRF Black | 45 | — | — | — | — |

Table 1 — Continued

|  | Vulcanizate No. | | | | |
|---|---|---|---|---|---|
|  | 1 | 2 | 3 | 4 | 5 |
| Regal 300 " | — | 35 | — | — | — |
| HAF " | — | — | — | 30 | 25 |
| GFP " | — | — | — | 5 | — |
| FEF " | — | — | 40 | — | — |
| Zinc Oxide | 5 | 5 | 5 | 10 | 5 |
| Stearic Acid | 1 | 2 | 1.5 | 2 | 0.5 |
| Magnesium Oxide | — | — | — | — | 4 |
| Nonox ZA | — | — | 2 | — | 1 |
| Flectol H | 1 | — | 1.5 | 1.5 | 1 |
| Santoflex 13 | — | 2 | — | — | — |
| Dutrex 729 | 2 | — | 7.5 | 20 | 10 |
| Sulphur | 2.5 | 2.5 | 2 | 2.5 | — |
| CBS | 0.7 | 0.5 | 1.5 | 1.25 | — |
| MBTS | — | — | 0.75 | — | — |
| TMTD | — | — | — | — | 0.7 |
| Na-22 | — | — | — | — | 0.7 |
| Cure Time minutes | 6 | 8 | 7 | 9 | 60 |
| Cure Temperature °C | 160 | 160 | 160 | 160 | 150 |

EXAMPLE 1

Preparation of 4-phenyl-1,2,4-triazoline-3,5-dione

Aqueous potassium hydroxide (100ml, 4M) was added to 4-phenyl-1-ethoxy-semicarbazide (prepared from ethyl carbazate and phenyl isocyanate according to the method of G. Zimmer and W. Deucker, Chem. Abs., 1961, 55, 22298h) (44.6g, 0.2 mole). The mixture was heated under reflux for 2 hrs. during which time the solid dissolved. The solution was filtered and allowed to cool. The solution was made acid to congo red and the 4-phenylurazole precipitated. The 4-phenylurazole was recrystallised from ethanol.

4-Phenylurazole (25gm) and anhydrous sodium sulphate were suspended in methylene chloride. The suspension was cooled in ice and nitrogen dioxide was passed in until all the 4-phenylurazole dissolved. The solution was filtered and the solvent removed under reduced pressure. The solid was either used as obtained or purified by sublimation (at 100°C and 10$^{-5}$mm of mercury).

Compounds having other groups in the 4-position were prepared by starting with the corresponding 4-substituted-alkoxy-semicarbazide.

EXAMPLE 2

Strips of vulcanizate 1 were dipped in boiling Genklene for 1 min to remove any surface contamination. The rubber was either dipped in a solution of 4-phenyl-1,2,4-triazoline-3,5-dione (1% w/v) for 3 mins, or bonded without further treatment. The metal was cleaned using the standard method. The metal and rubber were bonded using Chemlok 305 (a 1:1 mixture of parts A and B), at room temperature using a pressure of 6.25 kN/m$^2$. The results were as follows:

Untreated rubber, bond strength 0.8 kN/m with 100% rubber adhesive failure (average of 8 tests).

Rubber treated with 4-phenyl-1,2,4-triazoline-3,5-dione, bond strength 10.5 kN/m with ca. 97% rubber failure (average of 4 tests).

EXAMPLE 3

Strips of vulcanizate 3 were dipped in boiling Genklene for 1 min to remove any surface contamination. The rubber was either dipped in a solution of 4-phenyl-1,2,4-triazoline-3,5-dione (1% w/v) for 3 mins, or bonded without further treatment. The metal was cleaned using the standard method. The metal and rubber were bonded with an epoxy adhesive, at room temperature using a pressure of 6.25 kN/m$^2$. The results were as follows:

Untreated rubber, bond strength 0.01 kN/m with a 100% rubber adhesive failure (average 4 tests).

Rubber treated with 4-phenyl-1,2,4-triazoline-3,5-dione, bond strength 3.7 kN/m with ca. 100% rubber adhesive failure (average 2 tests).

EXAMPLE 4

Example 2 was repeated using rubber vulcanizate 4, the results were as follows:

Untreated rubber, bond strength 0.12 kN/m with 100% rubber adhesive failure (average 4 tests).

Rubber treated with 4-phenyl-1,2,4-triazoline-3,5-dione, bond strength 8.3 kN/m with the rubber breaking in all cases (average of 4 tests).

EXAMPLE 5

Example 2 was repeated using rubber vulcanizate 5. The results were as follows:

Untreated rubber, bond strength 7.1 kN/m with rubber breaking in all cases (average of 4 tests).

Rubber treated with 4-phenyl-1,2,4, -triazoline-3,5-dione, bond strength 8.3 kN/m with rubber breaking in all cases (average of 4 tests).

EXAMPLE 6

Raw natural rubber was sheeted out on a mill to approx 3mm and cut into strips. The rubber was either dipped into a 1% (w/v solution of 4-phenyl-1,2,4-triazoline-3,5-dione, or bonded without treatment. The metal was cleaned using the standard method. The rubber was bonded to the metal with an epoxy adhesive at room temperature and a pressure of 0.3 kN/m$^2$. When bonded these were separated by hand, the untreated rubber separated easily giving total rubber adhesive failure; the rubbers dipped in 4-phenyl-1,2,4-triazoline-3,5-dione solution tore at the beginning of the bonded area giving total rubber failure.

EXAMPLE 7

Strips of vulcanizate 1 were scrubbed with a solution of 4-phenyl-1,2,4-triazoline-3,5-dione in ethyl acetate (1 gm in 10cc) and the excess reagent was removed by wiping with solvent. The metal was cleaned in the standard way. The rubber was bonded to the metal using an epoxy adhesive at room temperature under a pressure of 6.25 kN/m$^2$. The bond strength obtained was 15.1 kN/m with about 95% rubber failure occurring (average of 6 results).

EXAMPLE 8

Strips of vulcanizate 1 were dipped in boiling Genklene to remove any surface contamination. The rubber was dipped in a 1% (w/v) solution of 4-methyl-1,2,4-triazoline-3,5-dione for either 1 or 5 mins. The metal was cleaned using the standard method, and bonded to the rubber using an epoxy adhesive at room temperature using a pressure of 6.25 kN/m$^2$. The results were as follows:

1 min dip bond strength 11.7 kN/m with about 90% rubber failure (average 4 tests).

5 min dip bond strength 11.1 kN/m with about 95% rubber failure.

EXAMPLE 9

Example 8 was repeated using vulcanizate 2. The results were as follows:

1 min dip bond strength 10.8 kN/m with about 98% rubber failure.

5 min dip bond strength 11.6 kN/m with 100% rubber failure.

EXAMPLE 10

Example 8 was repeated using a solution of 4-butyl-1,2,4-triazoline-3,5-dione in ethyl acetate (1% w/v). The results were as follows:

1 min dip bond strength 10.7 kN/m with 98% rubber failure.

5 min dip bond strength 14.5 kN/m with 95% rubber failure.

EXAMPLE 11

Example 10 was repeated using 4-α-napthyl-1,2,4-triazoline-3,5-dione. The results were as follows:

1 min dip bond strength 12.1 kN/m with 100% rubber failure.

5 min dip bond strength 11.5 kN/m with 100% rubber failure.

EXAMPLE 12

Strips of vulcanizate 1 were dipped in boiling Genklene for 1 min to remove any surface contamination. The rubber was dipped in a solution of bis-(p-3, 5-dioxo-1,2,4- triazoline-4-yl phenyl) methane in ethyl acetate (0.5% w/v) for ½, 1 or 5 mins. The metal was cleaned using the standard method and bonded to the rubber with an epoxy resin adhesive at room temperature using a pressure of 6.25 kN/m$^2$. The results were as follows:

1/2 min dip bond strength 10.1 kN/m with 90% rubber failure (average of 4 tests).

1 min dip bond strength 12.5 kN/m with 100% rubber failure (average of 4 tests).

5 min dip bond strength 10.1 kN/m with 90% rubber failure (average of 4 tests).

EXAMPLE 13

Strips of vulcanizate 1 were dipped in boiling Genklene to remove surface contamination. The rubber was either dipped in a solution of 4-phenyl-1,2,4-triazoline-3,5-dione in ethyl acetate (1% w/v) for 5 mins, or bonded without further treatment. The rubbers were bonded to like treated rubber using an epoxy adhesive at room temperature and a pressure of 6.25 kN/m$^2$. The results were as follows:

No treatment, bond strength 0.05 kN/m with 100% rubber adhesive failure (average 4 tests).

Dipped in 4-phenyl-1,2,4-triazoline-3,5-dione, bond strength 5.2 kN/m with 100% rubber failure (average of 4 tests).

EXAMPLE 14

Sheets of vulcanizates 1,3 and 4 were dipped in boiling Genklene for 1 min to remove surface contamination. They were then either dipped in solutions of 4-phenyl, or 4-methyl-1,2,4-triazoline-3,5-dione in ethyl acetate (1% w/v), or painted without further treatment. The rubbers were painted using a proprietory flexible paint made by Hughsons.

The test for adhesion and resistance to peeling is qualitative being conducted by stretching the rubber to beyond the point at which the paint film breaks and subjectively assessing the ease of peeling the paint from the rubber after relaxation.

The results are summarised in Table 2.

TABLE 2

| Treatment | Vulcanizate 1 | Vulcanizate 3 | Vulcanizate 4 |
|---|---|---|---|
| Untreated | 0 | 0 | 0 |
| Dipped in 4-phenyl-1,2,4-triazoline-3,5-dione | good | good | fair |
| Dipped in 4-methyl-1,2,4-triazoline-3,5-dione | fair | good | fair |

0 indicates no resistance to peeling paint off.

EXAMPLE 15

Vulcanizates 1,3 and 4 were treated by dipping in a solution of 4-phenyl-1,2,4-triazoline-3,5-dione (I), 3-methyl-1,2,4-triazoline-3,5-dione (II) or bis- (p-3,5-dioxo-1,2,4-triazoline-4-yl phenyl) methane (III) in ethyl acetate (I and II as 1% w/v III as 0.5% w/v) for 3 mins. Untreated samples were tested as a comparison.

The test procedure requires that the surface be covered with a ⅛ inch layer of aluminium oxide (150–200 mesh). The surface is the held vertically and tapped gently to remove the non-adhered material. The percentage of the area of the sample covered by the alumina is then recorded as a measure of surface tack. The following results were obtained:

| Treatment | % Surface covered with alumina | | |
|---|---|---|---|
| | Vulcanizate 1 | Vulcanizate 3 | Vulcanizate 4 |
| Untreated | 90 | 50 | 60 |
| Dipped in I | 0 | 0 | 0 |
| Dipped in II | 0 | 0 | 0 |
| Dipped in III | 0 | 0 | 0 |

EXAMPLE 16

Strips of vulcanizate 1 were dipped in a solution of 4-phenyl-1,2,4-triazoline-3,5-dione in ethyl acetate (1% w/v). The rubber was bonded to steel using a thermally curable adhesive. The bonding was carried out at 150°C for 30 mins, under a pressure of 300 kN/m². The results are summarised below:

| Treatment or dip time. | Bond strength kN/m |
|---|---|
| Untreated | 6.1 |
| ¼ min | 8.2 |
| ½ min | 11.1 |
| 1 min | 11.1 |
| 5 min | 8.2 – 10.2 |

We claim:
1. A method of treating a surface of a non-polar unsaturated elastomer to improve the adhesion characteristics thereof which method comprises applying to the surface of the elastomer a 4-substituted-1,2,4-triazoline-3,5-dione.
2. A method as claimed in claim 1 wherein the 4-substituted-1,2,4-triazoline-3,5-dione has the formula:

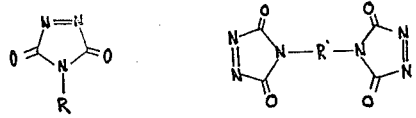

where R is an alkyl or aryl group and R' is an alkylene or arylene group.
3. A method as claimed in claim 2 wherein R is an alkyl group having from 1 to 6 carbon atoms, a phenyl group or a naphthyl group and R' is a phenylene group or bis phenylene methane group.
4. A method as claimed in claim 1 wherein the 4-substituted-1,2,4-triazoline-3,5-dione is applied to the elastomer surface in the form of a solution.
5. A method as claimed in claim 4 wherein the 4-substituted-1,2,4-triazoline-3,5-dione is applied to the elastomer surdace by dipping, scrubbing, painting or spraying.
6. A method as claimed in claim 1 wherein the amount of 4-substituted-1,2,4-triazoline-3,5-dione applied to the elastomer surface is in the range of from 0.1 to 20 g.m.$^{-2}$.
7. A method as claimed in claim 1 wherein the unsaturated elastomer is natural rubber, styrene-butadiene rubber, butadiene rubber, or blends thereof.
8. A method as claimed in claim 1 wherein the elastomer is a vulcanized elastomer.
9. A method as claimed in claim 1 wherein the elastomer is an unvulcanized elastomer.
10. A method of adhering a surface of a non-polar unsaturated elastomer to a substrate comprising treating the surface of the elastomer by applying thereto a 4-substituted-1,2,4-triazoline-3,5-dione, applying an adhesive to the treated elastomer surface, the substrate or both treated elastomer surface and substrate and adhering the elastomer surface and substrate together.

* * * * *